(12) United States Patent
Hirono

(10) Patent No.: US 8,080,954 B2
(45) Date of Patent: Dec. 20, 2011

(54) INVERTER APPARATUS

(75) Inventor: Daisuke Hirono, Isesaki (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 358 days.

(21) Appl. No.: 12/442,310

(22) PCT Filed: Jul. 30, 2007

(86) PCT No.: PCT/JP2007/064876
§ 371 (c)(1),
(2), (4) Date: Mar. 20, 2009

(87) PCT Pub. No.: WO2008/035509
PCT Pub. Date: Mar. 27, 2008

(65) Prior Publication Data
US 2009/0243531 A1  Oct. 1, 2009

(30) Foreign Application Priority Data

Sep. 22, 2006  (JP) ................................. 2006-256891

(51) Int. Cl.
*H02P 27/00* (2006.01)
*H02M 7/5387* (2007.01)

(52) U.S. Cl. .............. 318/400.01; 318/700; 318/400.17; 363/17; 363/132

(58) Field of Classification Search .................. 318/700, 318/400.01, 400.04, 400.17, 400.2, 400.26, 318/801; 363/17, 41, 95, 98, 131, 132
See application file for complete search history.

(56) References Cited

U.S. PATENT DOCUMENTS

| | | | |
|---|---|---|---|
| 6,396,225 B1 * | 5/2002 | Wakui et al. ............. 318/400.01 |
| 7,176,651 B2 * | 2/2007 | Kifuku et al. ................. 318/801 |
| 7,352,598 B2 * | 4/2008 | Hirono et al. .................... 363/41 |
| 7,813,152 B2 * | 10/2010 | Noda et al. ..................... 363/132 |
| 2008/0297079 A1 * | 12/2008 | Kanamori et al. ........ 318/400.06 |

* cited by examiner

*Primary Examiner* — Eduardo Colon Santana
(74) *Attorney, Agent, or Firm* — Baker Botts L.L.P.

(57) ABSTRACT

An inverter apparatus comprises an inverter circuit using pairs of switching elements. The pseudo AC voltage of each phase of this inverter circuit is controlled by pulse modulation using pulses generated by a PWM generator, and the pseudo AC voltages are applied to a power supplied load. The average voltage of respective phases of the output voltages applied to the power supplied load is detected as a virtual neutral voltage corresponding to the neutral voltage of the power supplied load by detecting the voltage at a common node where the phases of a voltage detecting circuit provided between the inverter circuit and the power supplied load are connected. The detected virtual neutral voltage is fed back for controlling the output duty of each phase by the PWM generator. Thus the output voltage of each phase from the inverter circuit is controlled so as to become a target output voltage. The target output voltage can be accurately obtained stably at all times.

5 Claims, 3 Drawing Sheets

DUTY of next timing is decided by voltage value detected here.

INVERTER APPARATUS

CROSS-REFERENCE TO RELATED APPLICATIONS

This application is the National Stage of International Patent Application No. PCT/JP2007/064876, filed Jul. 30, 2007, which claims the benefit of Japanese Patent Application No. 2006-256891, filed Sep. 22, 2006, the disclosures of which are incorporated herein by reference in their entirety.

TECHNICAL FIELD OF THE INVENTION

The present invention relates to an inverter apparatus, and specifically, to an inverter apparatus which can stabilize an output from an inverter circuit so that an output voltage does not fluctuate even if a voltage of a power source fluctuates when a DC voltage of a DC power source for a vehicle is converted into a pulse row-like pseudo AC voltage using a plurality of switching elements.

BACKGROUND ART OF THE INVENTION

A DC power source (a battery) is mounted, for example, on a vehicle, and the DC voltage of the DC power source is used as various kinds of powers and for various controls. This DC voltage of the DC power source is converted into a pulse row-like pseudo AC voltage using an inverter circuit with a plurality of switching elements, and for example, the converted pseudo AC voltage is used for a motor for driving a compressor in an air conditioner for a vehicle (for example, a brushless motor of an electric compressor, etc.) or another motor (for example, a reluctance motor or an induction motor), and used also as an output voltage to a transformer and the like.

As a compressor used in an air conditioner for a vehicle (refrigerant compressor), although there is a compressor employing only rotational force of an engine as its drive source, as an electric compressor or a hybrid compressor, usually a compressor incorporated with a brushless motor is used. This brushless motor is driven by a pulse row-like pseudo AC voltage converted by an inverter circuit, and its rotational speed is controlled by a method for changing a supplied effective voltage obtained by changing the duty ratio of the above-described pseudo AC voltage, namely, PWM (pulse width modulation).

However, a DC power source such as a battery, etc., mounted on a vehicle is liable to generate a voltage fluctuation in relation to an electric load, and for example, in a vehicle such as an electric car or a hybrid car having a motor for running, because a great load current flows in the motor for running at the time of accelerating, the voltage of a DC power source is rapidly lowered, and on the other hand, at the time of decelerating, the voltage of the DC power source is rapidly elevated by a regenerated current from the motor for running. Further, even in a usual engine-driving vehicle, if a power of a DC power source is consumed at a great amount, the voltage of the DC power source may be rapidly lowered.

If such a fluctuation of a voltage of a DC power source occurs, in proportion thereto an output voltage fluctuates. For example, when the above-described brushless motor is driven, accompanying with the voltage fluctuation, the rotational speed of the motor may be rapidly accelerated or decelerated. Further, an excessive current may flow at the time of deceleration, etc., and at worst, a protection circuit may operate and the motor may stop.

In order to deal with such a problem, in Patent document 1, a technology is disclosed wherein a voltage of a DC power source is detected and the duty is changed in accordance with the detected voltage value. Further, in Patent document 2, a technology is disclosed wherein a voltage of an output from an inverter circuit to a motor is detected and the duty is changed in accordance with the detected voltage value.
Patent document 1: JP-B-3084941
Patent document 2: JP-A-2005-57974

DISCLOSURE OF THE INVENTION

Problems to be Solved by the Invention

However, in a case of control by the above-described method disclosed in Patent document 1, there may be a case where it is difficult to obtain a desired output stably and accurately at all times. Namely, in the above-described control, a time delay originating from a processing speed and the like of a control device may occur during the time from the recognition of the fluctuation of the voltage of the DC power source until the amendment of the duty, and therefore, the duty may not be amended quickly and properly, and as a result, an inconvenience such as fluctuation of rotational speed, excessive current or lack of torque may occur in the brushless motor. Moreover, because the voltage of the power source to be detected is not a voltage capable of being applied to a motor terminal, an amount of a voltage drop of switching elements in the inverter circuit cannot be checked, and by the influence thereof, there are a problem that it is unknown how much voltage at the time when the three phases are in low voltage conditions is applied and a problem that the accuracy for the control deteriorates.

Further, when the control by the above-described method disclosed in Patent document 2 is employed, in a case where a voltage of only one phase at the output side of the motor is detected, it is unknown how much voltages are detected for the remaining two phases, and therefore, the accuracy for the control may deteriorate. Moreover, if all voltages of three phases are tried to be detected, detection processing must be carried out for the three phases, and therefore, the amount for processing of voltage detection may increase. In addition, there is a problem that the circuit and control therefor may become complicated.

Accordingly, an object of the present invention is to provide an inverter apparatus in which a desired output voltage can be obtained stably and accurately at all times even if a voltage of a power source fluctuates and the control can be carried out easily and surely by a simple circuit structure, when a voltage of a DC power source is converted into pulse row-like pseudo AC voltages using an inverter circuit with a plurality of switching elements.

Means for Solving the Problems

To achieve the above-described object, an inverter apparatus according to the present invention is an inverter apparatus wherein a plurality of element sets each comprising a pair of switching elements connected to each other in series are connected in parallel to each other relative to a DC power source to form an inverter circuit which converts a DC voltage of the DC power source into pseudo AC voltages with a plurality of pulse row-like phases and outputs the pseudo AC voltages, an output control circuit including a PWM generator capable of adjusting each phase of the pseudo AC voltages by pulse modulation is connected to the inverter circuit, and output voltages from the inverter circuit are applied to a power supplied load, and the inverter apparatus is characterized in that an average voltage of respective phases of the output voltages applied to the power supplied load is detected as a virtual neutral voltage corresponding to a neutral voltage of the power supplied load by detecting a voltage at a common node where respective phases of a voltage detecting circuit provided between the inverter circuit and the power supplied load are connected, and by feeding back the detected virtual neutral voltage for controlling an output duty of each phase by the PWM generator, the output voltage of each phase from the inverter circuit is controlled so as to become a target output voltage.

Namely, in the inverter apparatus according to the present invention, not a voltage of a power source but a voltage actually outputted from the inverter circuit is detected, and the output voltage is not detected as a voltage of each phase but detected as an average output voltage of the respective phases, and it is detected as a virtual neutral voltage corresponding to a neutral voltage of the power supplied load. Therefore, the problems in the aforementioned Patent document 1 detecting a voltage of a power source, such as deterioration of control accuracy, may be solved, and the problems in the aforementioned Patent document 2 requiring detection of output voltages of respective phases for improving its control accuracy, such as making the circuit and the control complicated, may also be solved, and consequently, by a simple structure, an accurate control becomes possible and a quick feedback control becomes possible.

In this inverter apparatus according to the present invention, it is preferred that a high voltage value of the virtual neutral voltage is detected during a period of time when voltage values of respective phases of the output voltages from the inverter circuit are all high. By this, the detection result can be quickly fed back at a next high timing, thereby increasing the control accuracy. The output duty of each phase may be variably controlled by calculation based on the following equation.

$$\text{output duty} = \text{target output voltage}/\text{high voltage value of detected virtual neutral voltage}$$

Where, a state of the high voltage value of the output voltage means a state where the pulse row-like pseudo AC voltage indicates a maximum voltage value.

Further, in order to further improve the control accuracy, it is preferred also to detect a low voltage value. Namely, it is preferred that a low voltage value of the virtual neutral voltage is further detected during a period of time when voltage values of respective phases of the output voltages from the inverter circuit are all low, and the output duty of each phase is variably controlled by calculation based on the following equation.

$$\text{output duty} = \text{target output voltage}/(\text{high voltage value of detected virtual neutral voltage} - \text{low voltage value of detected virtual neutral voltage})$$

Where, a state of the low voltage value of the output voltage means a state where the pulse row-like pseudo AC voltage indicates a minimum voltage value.

In the present invention, the power supplied load is not particularly limited, and although it may be an electric equipment using the output from the inverter circuit, in particular, the present invention is suitable for a case where the power supplied load is a motor required with a control of its rotational speed, from the viewpoint of a merit where the rotational speed can be controlled at a high accuracy by the high-accuracy control of the output voltage.

In particular, the present invention is very suitable for a case where the above-described motor is a motor for driving a compressor, particularly, for a case where the motor is a motor for driving a compressor provided in a refrigeration circuit of an air conditioner for a vehicle. In such a motor for driving a compressor, a case frequently occurs where the motor is incorporated into the compressor, the motor is exposed to refrigerant, and the neutral voltage of the motor itself cannot be detected. However, by detecting the virtual neutral voltage as in the present invention, it becomes possible to detect the virtual neutral voltage as an actual average output voltage, and without detecting all of the output voltages of the respective phases, an actual output voltage necessary for the control can be easily detected at a high accuracy, and it can be used for output duty control for each phase.

Effect According to the Invention

Thus, in the inverter apparatus according to the present invention, an actually outputted voltage is detected as the virtual neutral voltage, the output duty of each phase is calculated based thereon, and a PWM control is carried out so as to achieve the calculated output duty. Therefore, a desired target output voltage may be stably obtained at all times without receiving influence of a voltage drop of power elements or a fluctuation of a power source voltage.

EXPLANATION OF SYMBOLS

Figure 1:
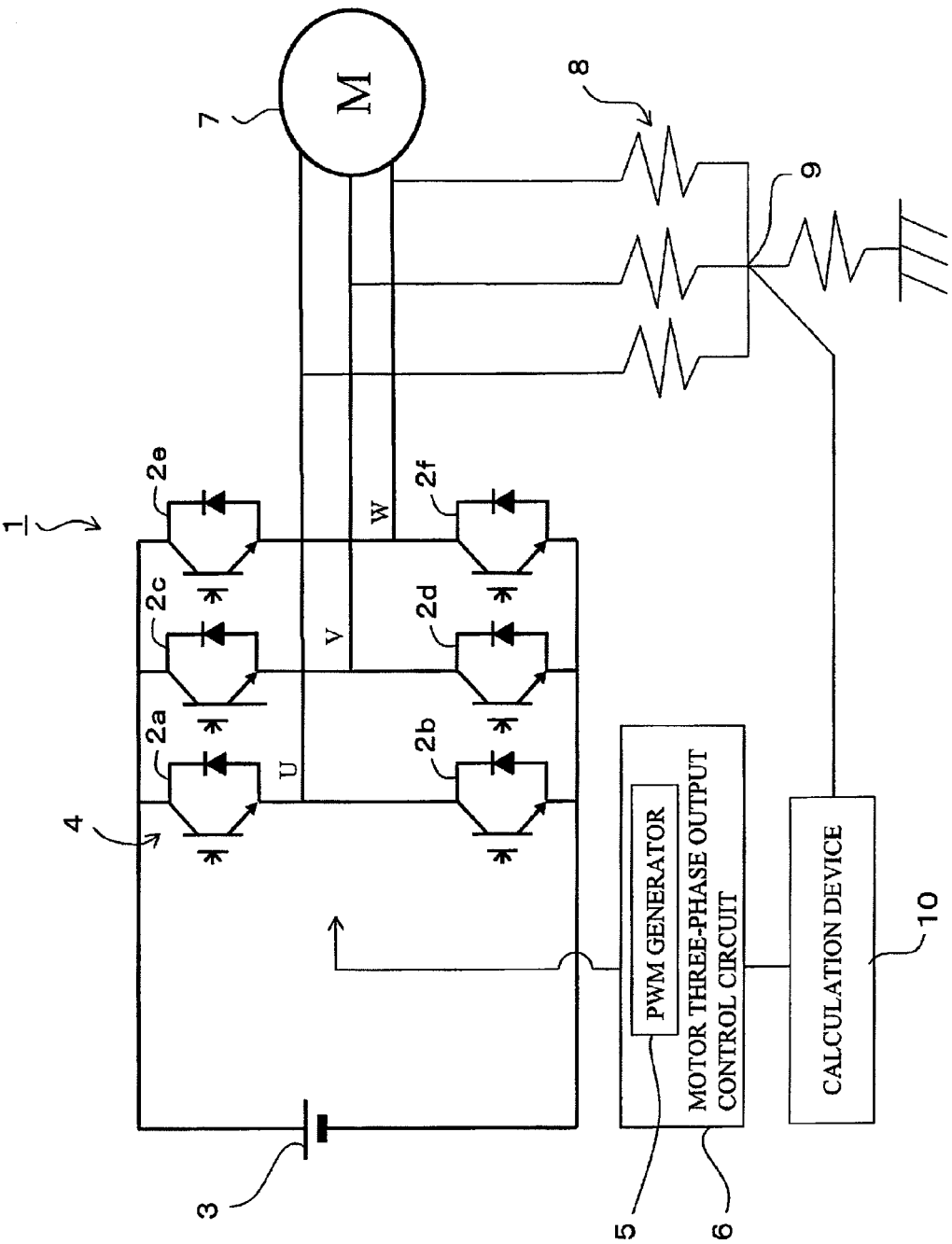
FIG. 1 is a schematic diagram of an inverter apparatus according to an embodiment of the present invention.

1: inverter apparatus
2a, 2b, 2c, 2d, 2e, 2f: switching element
3: DC power source
4: inverter circuit
5: PWM generator
6: motor three-phase output control circuit
7: motor as power supplied load
8: voltage detecting circuit
9: virtual neutral node
10: calculation device

THE BEST MODE FOR CARRYING OUT THE INVENTION

Hereinafter, desirable embodiments of the present invention will be explained referring to figures.

FIG. 1 depicts an inverter apparatus according to an embodiment of the present invention, and specifically, depicts a case formed as a motor driving power circuit for outputting pulse row-like pseudo AC voltages to a three-phase motor as a power supplied load (for example, a three-phase brushless motor incorporated into a compressor in an air conditioner for a vehicle). In FIG. 1, symbol 1 indicates an inverter apparatus, and in inverter apparatus 1, a plurality of element sets (in this embodiment, three sets of elements) each comprising a pair of switching elements (2a and 2b, 2c and 2d, and 2e and 2f) connected to each other in series are connected in parallel to each other relative to a DC power source 3 (for example, a battery) to form an inverter circuit 4 which converts a DC voltage of DC power source 3 into pulse row-like pseudo AC voltages and outputs the pseudo AC voltages. To inverter circuit 4, a motor three-phase output control circuit 6 including a PWM generator 5 capable of adjusting the above-described pseudo AC voltages by pulse modulation is connected as an output control circuit. The respective three output phases U, V, W from inverter circuit 4 are connected to corresponding poles of motor 7 (for example, a three-phase brushless motor, however, any other motor capable of being driven by application of the pseudo AC voltages is available.), and the motor 7 is driven at a predetermined rotational speed by application of predetermined voltages. Pulse row-like pseudo AC voltages are outputted to motor 7, an average voltage of the pulse row-like pseudo AC voltages becomes an effective voltage applied to motor 7, and motor 7 is driven at a rotational speed corresponding to the effective voltage.

Between inverter circuit 4 and motor 7, a voltage detecting circuit 8 is provided for detecting an average voltage of the respective phases of the output voltages to motor 7. This voltage detecting circuit 8 is formed so as to detect the voltages by resistance division, and before reaching the earth, the respective circuits from the respective phases are gathered as a single common node. This common node is formed as a virtual neutral node 9 corresponding to a neutral node in motor 7, and at this node, the virtual neutral voltage corresponding to the neutral voltage of motor 7 is detected. The virtual neutral voltage detected at this virtual neutral node 9 is sent to calculation device 10 for carrying out the calculation described later, and the calculated value is fed back for the control of output duty of each phase by PWM generator 6. By this feedback, the output voltages of the respective phases from inverter circuit 4 are controlled so as to become target output voltages.

Namely, in inverter apparatus 1 according to the present invention, not a voltage of a power source but a voltage actually outputted from inverter circuit 4 is detected, and the output voltage is not detected as a voltage of each phase but detected as an average output voltage of the respective phases, and it is detected as a virtual neutral voltage corresponding to a neutral voltage of motor 7. Since not a voltage of a power source side but an actually outputted voltage is detected, the control accuracy may be improved, and because it is not necessary to detect an output voltage for each phase, the structure of the circuit and the control are both simple. The calculation and the control of output duty is carried out using a virtual neutral voltage as an average voltage of all of the respective phases, and via the control of the output duty, the effective voltage of motor 7 can be controlled at a high accuracy, and the accuracy of the control of the rotational speed can also be improved.

Figure 2:
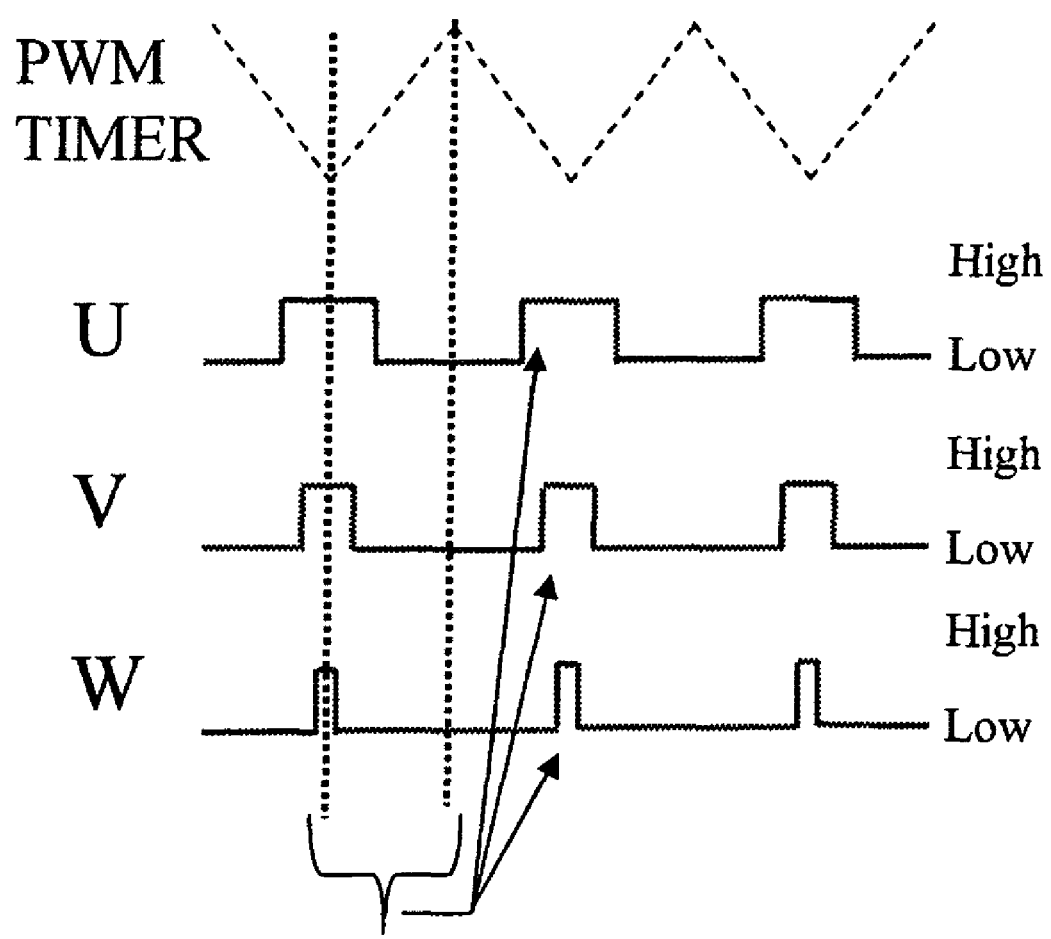
FIG. 2 is a time chart showing an example of timings for detecting voltages in the inverter apparatus depicted in FIG. 1.

The above-described virtual neutral voltage is detected, for example, at a timing shown in FIG. 2.

In FIG. 2, the virtual neutral voltage (High) is detected during a period of time when the three output phases U, V, W from inverter circuit 4 are all High in voltage. Further, in this example shown in the figure, the virtual neutral voltage (Low) is detected during a period of time when the three output phases U, V, W from inverter circuit 4 are all Low in voltage. By the detection at such timings, the detected voltages can be fed back to the control of output duty at a next timing (at the timing immediately thereafter), and a quick and accurate control becomes possible.

Here, a concrete operation in the present invention will be explained with respect to principle of operation.

At the output timing where the three phases are in high voltage states, the output voltages Vu, Vv, Vw of the respective phases are expressed as follows.

$$Vu = Vcc - Vu'(IGBT, Di)$$

$$Vv = Vcc - Vv'(IGBT, Di)$$

$$Vw = Vcc - Vw'(IGBT, Di)$$

At the output timing where the three phases are in low voltage states, the output voltages Vu, Vv, Vw of the respective phases are expressed as follows.

$$Vu = -Vu'(IGBT, Di)$$

$$Vv = -Vv'(IGBT, Di)$$

$$Vw = -Vw'(IGBT, Di)$$

Where, Vu', Vv', Vw' represent voltage drop components of diodes or power transistors in switching elements, IGBT represents a drop voltage of power transistor, and Di represents a drop voltage of diode.

The voltage value outputted to the output circuit in the present invention when three phases are operated at high voltage conditions becomes as follows.

$$Vhi = 1/3(Vu+Vv+Vw) = Vcc - 1/3[Vu'(IGBT, Di) + Vv'(IGBT, Di) + Vw'(IGBT, Di)]$$

The voltage value outputted to the output circuit in the present invention when three phases are operated at low voltage conditions becomes as follows.

$$Vlo = 1/3(Vu + Vv + Vw)$$

$$= -1/3[Vu'(IGBT, Di) + Vv'(IGBT, Di) + Vw'(IGBT, Di)]$$

Then, by detecting the virtual neutral voltage at voltage detecting circuit 8 in the present invention, an average potential difference capable of being applied to motor 7 can be determined in consideration of voltage drop in the switching elements when the power transistors are turned to be ON and OFF, and by such a simple manner, the output voltage can be detected.

Vcc=Vhi−Vlo is calculated, and the duty of each phase is calculated using the above-described calculated data, as follows:

Duty value of U phase=Vu(a voltage value desired to be applied to U phase)/Vcc,

Duty value of V phase=Vv(a voltage value desired to be applied to V phase)/Vcc,

Duty value of W phase=Vw(a voltage value desired to be applied to W phase)/Vcc.

By output of these duties of the respective phases, the voltages desired to be applied are formed as rectangular pulse-row forms, and target voltages can be applied to motor 7.

Figure 3:
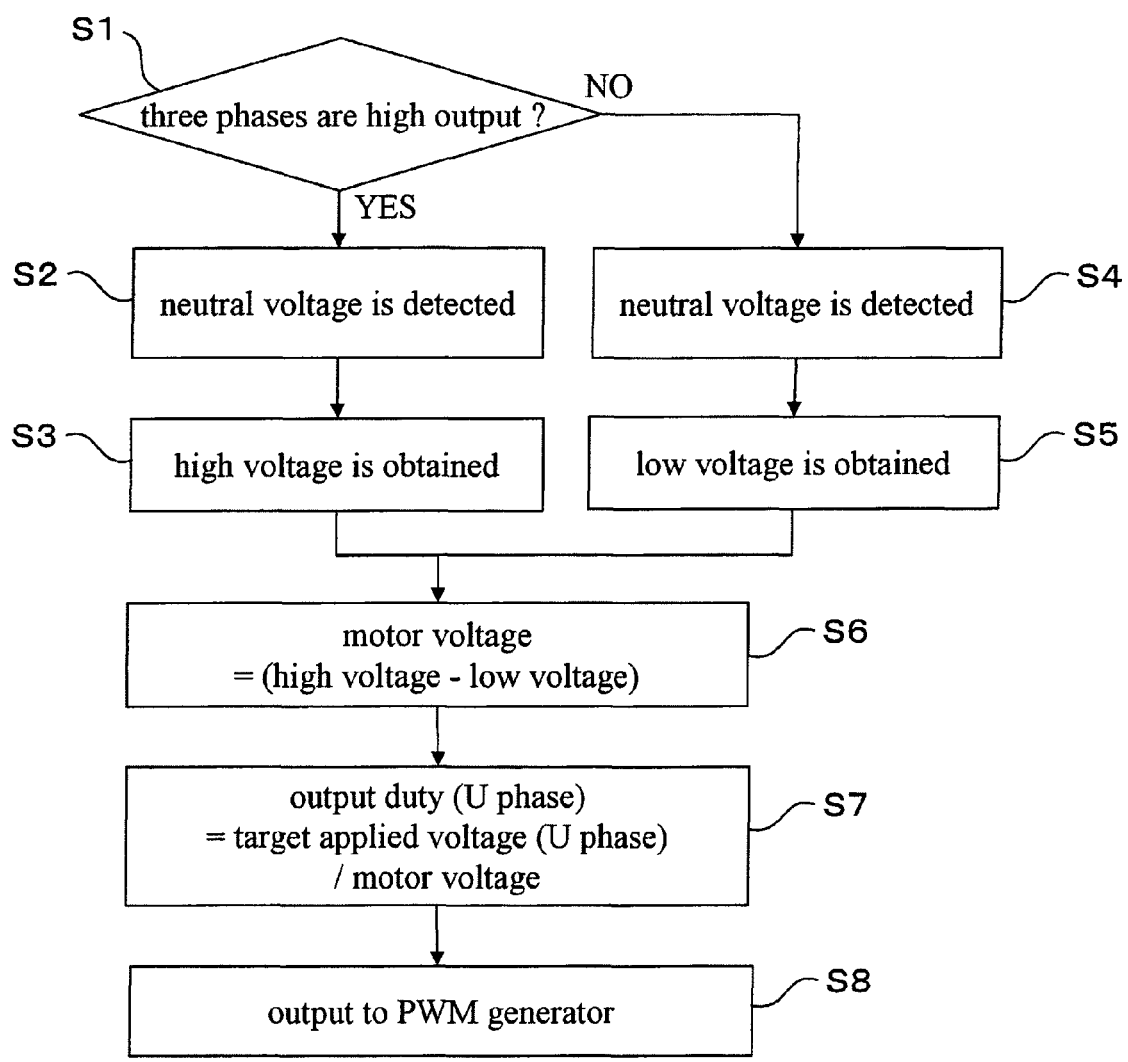
FIG. 3 is a flow chart showing an example of control in the inverter apparatus depicted in FIG. 1.

As a control flow with the time after detection of voltage, for example, a flow shown in FIG. 3 can be used. Although FIG. 3 shows a case of U phase, similar manners may be used as to V phase and W phase.

First, in order to detect the virtual neutral voltage at the timing depicted in FIG. 2, it is determined whether the three phases are all in high output states (step S1), if so, the virtual neutral voltage (high) is obtained by detecting the virtual neutral voltage (steps S2, S3), and if not so, the virtual neutral voltage (low) is obtained by detecting the virtual neutral voltage (steps S4, S5). Then, an average voltage value as the motor voltage is determined by the equation of (virtual neutral voltage (high)-virtual neutral voltage (low)) (step S6), and using this motor voltage, the output duty (U phase) is calculated by the equation of (target applied voltage (U phase)/motor voltage) (step S7). At step S8, the calculated output duty (U phase) is outputted to the PWM generator, and the output voltage of the U phase is controlled so as to become the target applied voltage. Similarly, the output voltages of V phase and W phase are controlled so as to become target applied voltages, and the output voltage (effective voltage) to motor 7 can be accurately controlled so as to become a target value. The detection and the calculation of this flow is repeated substantially at all times.

INDUSTRIAL APPLICATIONS OF THE INVENTION

Although the above-described embodiment has been explained mainly with respect to a case where the present invention is applied to the voltage application circuit for a three-phase brushless motor, the present invention can be applied to any inverter apparatus converting a DC voltage from a DC power source into pulse row-like pseudo AC voltages, and in particular, the present invention is suitably applied to a voltage application circuit to a motor for driving a compressor in an air conditioner for a vehicle, in which the voltage of the DC power source is liable to fluctuate.

The invention claimed is:

1. An inverter apparatus wherein a plurality of element sets each comprising a pair of switching elements connected to each other in series are connected in parallel to each other relative to a DC power source to form an inverter circuit which converts a DC voltage of said DC power source into pseudo AC voltages with a plurality of pulse row-like phases and outputs said pseudo AC voltages, an output control circuit including a PWM generator capable of adjusting each phase of said pseudo AC voltages by pulse modulation is connected to said inverter circuit, and output voltages from said inverter circuit are applied to a power supplied load, characterized in that an average voltage of respective phases of said output voltages applied to said power supplied load is detected as a virtual neutral voltage corresponding to a neutral voltage of said power supplied load by detecting a voltage at a common node where respective phases of a voltage detecting circuit provided between said inverter circuit and said power supplied load are connected, and by feeding back said detected virtual neutral voltage for controlling an output duty of each phase by said PWM generator, said output voltage of each phase from said inverter circuit is controlled so as to become a target output voltage, wherein a high voltage value of said virtual neutral voltage is detected during a period of time when voltage values of respective phases of said output voltages from said inverter circuit are all high, and said output duty of each phase is variably controlled by calculation based on the following equation:

output duty = target output voltage/high voltage value of detected virtual neutral voltage, in which a state of said high voltage value of said output voltage means a state in which said pulse row-like pseudo AC voltage indicates a maximum voltage value.

2. The inverter apparatus according to claim 1, wherein a low voltage value of said virtual neutral voltage is further detected during a period of time when voltage values of respective phases of said output voltages from said inverter circuit are all low, and said output duty of each phase is variably controlled by calculation based on the following equation:

output duty=target output voltage/(high voltage value of detected virtual neutral voltage−low voltage value of detected virtual neutral voltage), in which a state of said low voltage value of said output voltage means a state in which said pulse row-like pseudo AC voltage indicates a minimum voltage value.

3. The inverter apparatus according to claim 1, wherein said power supplied load is a motor.

4. The inverter apparatus according to claim 3, wherein said motor is a motor for driving a compressor.

5. The inverter apparatus according to claim 4, wherein said motor is a motor for driving a compressor provided in a refrigeration circuit of an air conditioner for a vehicle.

* * * * *